United States Patent
Himayat et al.

(10) Patent No.: US 9,247,454 B2
(45) Date of Patent: Jan. 26, 2016

(54) GROUPING SMALL BURST TRANSMISSIONS FOR DOWNLINK MACHINE-TO-MACHINE COMMUNICATIONS

(75) Inventors: Nageen Himayat, Fremont, CA (US); Kerstin Johnsson, Palo Alto, CA (US); Shilpa Talwar, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 12/977,582

(22) Filed: Dec. 23, 2010

(65) Prior Publication Data

US 2012/0163160 A1    Jun. 28, 2012

(51) Int. Cl.
| | |
|---|---|
| H04J 11/00 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 4/00 | (2009.01) |
| H04W 28/06 | (2009.01) |
| H04W 72/12 | (2009.01) |

(52) U.S. Cl.
CPC .............. *H04W 28/06* (2013.01); *H04W 4/005* (2013.01); *H04W 72/121* (2013.01)

(58) Field of Classification Search
CPC .... H04W 28/06; H04W 4/005; H04W 72/121
USPC ......................... 370/203, 216, 328
See application file for complete search history.

(56) References Cited

U.S. PATENT DOCUMENTS

| | | | |
|---|---|---|---|
| 6,487,690 B1* | 11/2002 | Schuster et al. | ............... 714/752 |
| 2005/0152359 A1* | 7/2005 | Giesberts et al. | ............. 370/389 |
| 2006/0056362 A1 | 3/2006 | Jang et al. | |

(Continued)

FOREIGN PATENT DOCUMENTS

| | | |
|---|---|---|
| TW | 201038089 A | 10/2010 |
| WO | 2012/087693 A2 | 6/2012 |
| WO | 2012/087693 A3 | 1/2013 |

OTHER PUBLICATIONS

International Search Report and Written Opinion Received for PCT Application No. PCT/US2011/064805, Mailed on Jul. 31, 2012, 9 pages.

(Continued)

*Primary Examiner* — Shripal Khajuria
*Assistant Examiner* — Farhad Ali
(74) *Attorney, Agent, or Firm* — Alpine Technology Law Group LLC (57) ABSTRACT

Briefly, in accordance with one or more embodiments, a mechanism disclosed herein groups transmissions to machine-to-machine (M2M) devices in the downlink which can significantly reduce the overhead of transmission. One or more bursts to be transmitted in the downlink to one or more respective devices are aggregated and concatenated into a concatenated burst comprising one or more sub-bursts corresponding to the one or more bursts. The concatenated burst is encoded as a single payload to be transmitted, and the payload is transmitted to the one or more devices such that the devices are capable of decoding their respective sub-bursts in the concatenated burst.

25 Claims, 7 Drawing Sheets

(56) References Cited

U.S. PATENT DOCUMENTS

| | | | |
|---|---|---|---|
| 2006/0056443 A1* | 3/2006 | Tao et al. | 370/462 |
| 2007/0053354 A1* | 3/2007 | Rudolf et al. | 370/389 |
| 2008/0076357 A1 | 3/2008 | Chen et al. | |
| 2010/0188965 A1* | 7/2010 | Cheng et al. | 370/203 |
| 2010/0246427 A1 | 9/2010 | Gheorghiu et al. | |
| 2011/0085497 A1* | 4/2011 | Fang et al. | 370/328 |
| 2014/0359278 A1 | 12/2014 | Meyerstein et al. | |

OTHER PUBLICATIONS

"Input Towards Working Documents on objectives and Requirements for Mobile Wireless Access Systems for Communications to a Large Number of Ubiquitous Sensors and/or Actuators Scattered over Wide Areas in the Land Mobile Service", IEEE Radiocommunication Study Groups, IEEE L802.16-10/009, Nov. 2010, 5 pages.

"Part 16: Air Interface for Fixed and Mobile Broadband Wireless Access Systems", DRAFT Amendment to IEEE Standard for Local and metropolitan area networks, Advanced Air Interface, May 22, 2010, 932 Pages.

International Preliminary Report on Patentability received for PCT Patent Application No. PCT/US2011/064805, mailed on Jul. 4, 2013, 6 pages.

Office Action received for European Patent Application No. 11849910.2, mailed on Jul. 30, 2013, 2 pages of Office Action.

Office Action received for Chinese Patent Application No. 201180062102.0, mailed on Apr. 3, 2015, 13 pages, including 6 pages of English translation.

Office Action and Search Report received for Taiwanese Patent Application No. 100147952, dated on Jul. 17, 2015, 11 pages including 1 page of English translation.

Office Action received for Chinese Patent Application No. 201180062102.0, issued on Nov. 18, 2015, 10 pages.

* cited by examiner

GROUPING SMALL BURST TRANSMISSIONS FOR DOWNLINK MACHINE-TO-MACHINE COMMUNICATIONS

BACKGROUND

Machine-to-machine (M2M) communications describes a vision for connecting and managing billions of everyday objects to offer a diverse and rich set of services. Some examples include smart-grid applications, tracking and tracing applications, such as video surveillance, fleet tracking, connected consumer electronics, telemedicine, and so on. A vast array of M2M applications may be served by wireless wide area networks (WWANs) and/or wide area cellular networks, posing new and challenging requirements. Two aspects of these challenges are supporting the massive device connectivity and supporting the often conflicting and diverse set of requirements imposed by each M2M application. For a large number of M2M applications, communication with devices is often infrequent and at low data rates. Examples of these types of M2M applications are control, sensing, and monitoring of environmental sensors. Given the massive number of M2M devices that must be supported, it may be helpful for the "small-burst" transmissions to and from these M2M devices in the downlink to be transmitted efficiently and with minimal overhead.

DESCRIPTION OF THE DRAWING FIGURES

Claimed subject matter is particularly pointed out and distinctly claimed in the concluding portion of the specification. Such subject matter, however, may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled may, however, also mean that two or more elements may not be in direct contact with each other, but yet may still cooperate and/or interact with each other. For example, "coupled" may mean that two or more elements do not contact each other, but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over" may, however, also mean that two or more elements are not in direct contact with each other. For example, "over" may mean that one element is above another element, but not contact each other and may have another element or elements in between the two elements. Furthermore, the term "and/or" may mean "and", it may mean "or," it may mean "exclusive-or," it may mean "one," it may mean "some, but not all," it may mean "neither," and/or it may mean "both," although the scope of claimed subject matter is not limited in this respect. In the following description and/or claims, the terms "comprise" and "include," along with their derivatives, may be used and are intended as synonyms for each other.

Figure 1:
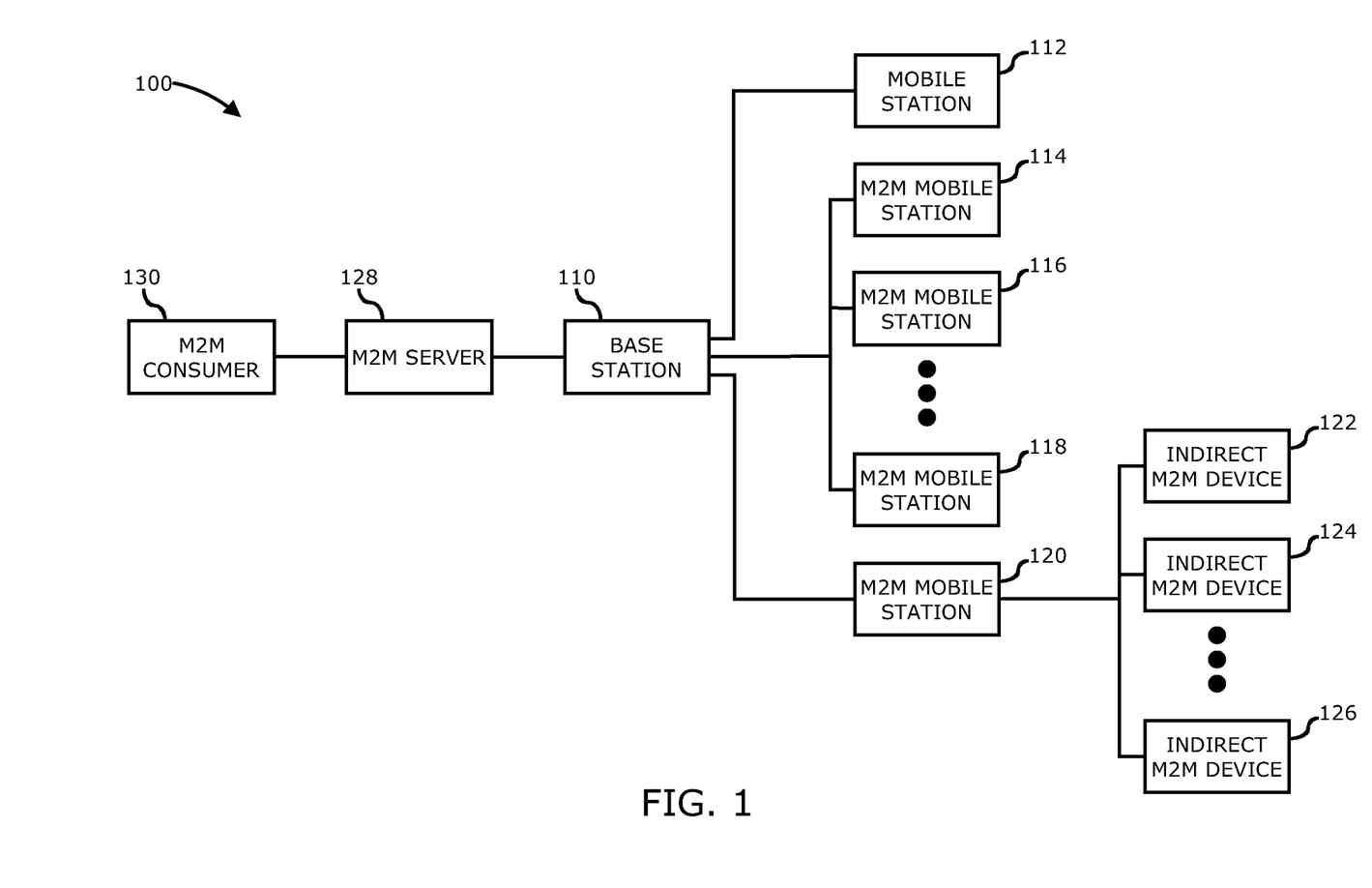
FIG. 1 is a block diagram of a wireless machine-to-machine network in accordance with one or more embodiments.

Referring now to FIG. 1, a block diagram of a wireless machine-to-machine network in accordance with one or more embodiments will be discussed. As shown in FIG. 1, network 100 may comprise a wireless network that may be compliant with an Institute of Electrical and Electronics Engineers (IEEE) standard, such as an IEEE 802.16 standard and/or a cellular network standard, for example a Long Term Evolution (LTE) network. In one or more particular embodiments, network 100 may be compliant with an IEEE 802.16p standard or an LTE Advanced (LTE-A) standard, although the scope of the claimed subject matter is not limited in this respect. In general, network 100 may operate using orthogonal frequency-division multiple access (OFDMA) technology, although the scope of the claimed subject matter is not limited in this respect. In one or more embodiments, network 100 comprises an IEEE 802.16 network that is adapted to implement machine-to-machine (M2M) communications. Base station 110 may communicate with one or more mobile stations 112 that may be non-M2M mobile stations, but may be otherwise capable of operating as an IEEE 802.16 mobile station, advanced mobile station, and so on. Base station 110 may be further capable of communicating with one or more M2M mobile stations such as M2M mobile station 114, M2M mobile station 116, up to an Nth M2M mobile station 118. An M2M mobile station may be an IEEE 802.16 mobile station that includes M2M functionality. The base station 110 provides access between the mobile stations and an M2M server 128. The M2M server also includes an interface capable of being accessed by an M2M consumer 130 either via direct coupling between M2M consumer 130 and M2M server 128, or via an indirect or remote coupling, such as via an intermediate network, such as the Internet, although the scope of the claimed subject matter is not limited in this respect.

The M2M consumer 130 is a device or entity that utilizes network 100 for M2M services, for example, a corporation, a governmental entity, a hospital, a utility, and so on, among several examples. The M2M server 128 may be disposed within a Connectivity Service Network (CSN) of network 100, or may reside external to a CSN of network 100 to control and/or provide services to one or more M2M devices, such as the M2M mobile stations. In such an arrangement, an M2M application may run on the M2M server 128 and/or on an M2M device, either separately or in combinations thereof. In one or more embodiments, network 100 may support two types of M2M communications. The first type of M2M communications may comprise communications between one or more M2M devices, such as the M2M mobile stations and base station 100. The second type of M2M communications may comprise point-to-multipoint communication between M2M devices and the base station 110. For indirect M2M devices, such as Indirect M2M device 122, Indirect M2M device 124, up to an Mth Indirect M2M device 126, an M2M device such as M2M mobile station 120 may function as an aggregation point for the Indirect-M2M devices. In one or more embodiments, the Indirect M2M devices may comprise sensors and/or lower power devices that may operate, for example, in compliance with an IEEE 802.11 standard or an IEEE 802.15 standard, and so on, and the scope of the claimed subject matter is not limited in this respect. In such embodiments, the Indirect M2M devices communicate on network 100 using an M2M device, such as M2M mobile station 120 as an aggregator. The indirect M2M devices may use the same air interface protocols as the directly connected M2M devices, or alternatively may utilize other protocols, typically short-range protocols, such as the ZigBee protocol in the IEEE 802.15 standard for Low-Rate Wireless Personal Area Networks (LR-WPANs), the Bluetooth protocol managed by the Bluetooth Special Interest Group (SIG) for Personal Area Networks (PANs), Ultra-wideband (UWB) for low-energy level, short-range communications, and so on, to communicate with the aggregation devices, although the scope of the claimed subject matter is not limited in this respect.

In accordance with one or more embodiments as will be discussed in further detail, herein, network 100 is capable of grouping smaller bursts belonging to several M2M devices in the downlink (where communication is from the base station or an aggregation point to the M2M devices) and encoding the bursts via a single channel encoded forward error correction (FEC) block in order to efficiently occupy at least a minimum payload for burst transmission. In one or more alternative embodiments, other aggregation mechanisms may be utilized, such as a common cyclical redundancy check (CRC) across the multiple M2M devices to lower the transmission overhead otherwise associated with smaller bursts. In general, network 100 may be configured to avoid wasting capacity in data transmissions in which fixed-size transmission resources are utilized to transmit smaller amounts of data. For example, in the IEEE 802.16m standard, a burst structure may have a minimum payload size that is several bytes long. When, however, transmitting smaller-sized bursts of only one or a few bits in length, resources may be wasted by transmitting the smaller-sized bursts in a larger-sized payload structure wherein the overhead of each transmission may be larger than needed. Network 100 as shown in FIG. 1 is configured to aggregate the smaller-sized bursts from several M2M devices into a single transmission payload in order to fill up at least the minimal payload of the burst. An example wherein network 100 comprises a wireless wide area network (WWAN) is shown in and described with respect to FIG. 2, below.

Figure 2:
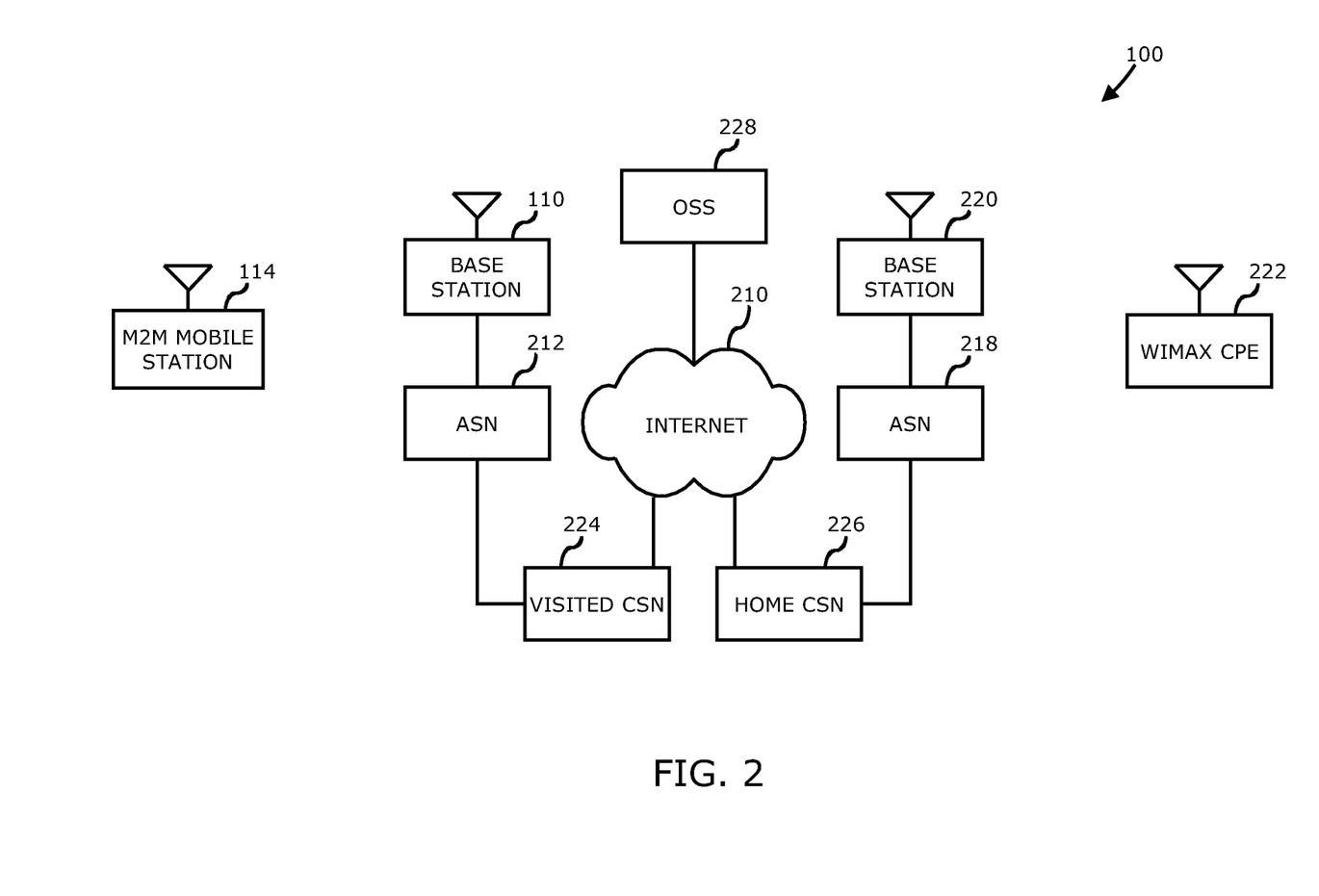
FIG. 2 is a block diagram of a wireless network capable of grouping small burst transmissions in accordance with one or more embodiments.

Referring now to FIG. 2, a block diagram of a wireless network capable of grouping small-burst transmissions in accordance with one or more embodiments will be discussed. As shown in FIG. 2, network 100, which may comprise an expanded version of the network shown in FIG. 1 may be an Internet Protocol (IP) type network comprising an Internet 210 type network or the like that is capable of supporting mobile wireless access and/or fixed wireless access to internet 210. In one or more embodiments, network 100 may be in compliance with a Worldwide Interoperability for Microwave Access (WiMAX) standard, according an IEEE 802.16 standard. Alternatively, network 100 may be in compliance with a Third Generation Partnership Project Long Term Evolution (3GPP LTE) standard or the like. In network 100, access service network (ASN) 212 is capable of coupling with base station (BS) 110 to provide wireless communication between M2M mobile station 114 and Internet 210. ASN 212 may implement profiles that are capable of defining the mapping of network functions to one or more physical entities on network 100. Base station 110 may comprise radio equipment to provide radio-frequency (RF) communication with subscriber station 114, and may comprise, for example, the physical layer (PHY) and media access control (MAC) layer equipment. Base station 110 may further comprise an IP backplane to couple to Internet 210 via ASN 212. Network 100 may further comprise a visited connectivity service network (CSN) 224 capable of providing one or more network functions including, but not limited to, proxy- and/or relay-type functions, for example, authentication, authorization and accounting (AAA) functions, dynamic host configuration protocol (DHCP) functions, or domain name service controls or the like, domain gateways, such as public switched telephone network (PSTN) gateways or Voice over Internet Protocol (VoIP) gateways, and/or Internet Protocol (IP) type server functions, or the like. Visited CSN 224 may be referred to as a visited CSN in the case, for example, in which visited CSN 224 is not part of the regular service provider of M2M mobile station 114, for example, in which M2M mobile station 114 is roaming away from its home CSN, such as home CSN 226. In a fixed wireless arrangement, WiMAX-type customer premises equipment (CPE) 222 may provide broadband access to Internet 210 via base station 220, ASN 218, and home CSN 226. In accordance with one or more embodiments, operation support system (OSS) 228 may be part of network 100 to provide management functions for network 100 and to provide interfaces between functional entities of network 100. Network 100 of FIG. 2 is merely one type of wireless network capable of supporting aggregation of M2M bursts in the downlink, and the scope of the claimed subject matter is not limited in this respect.

Figure 3:
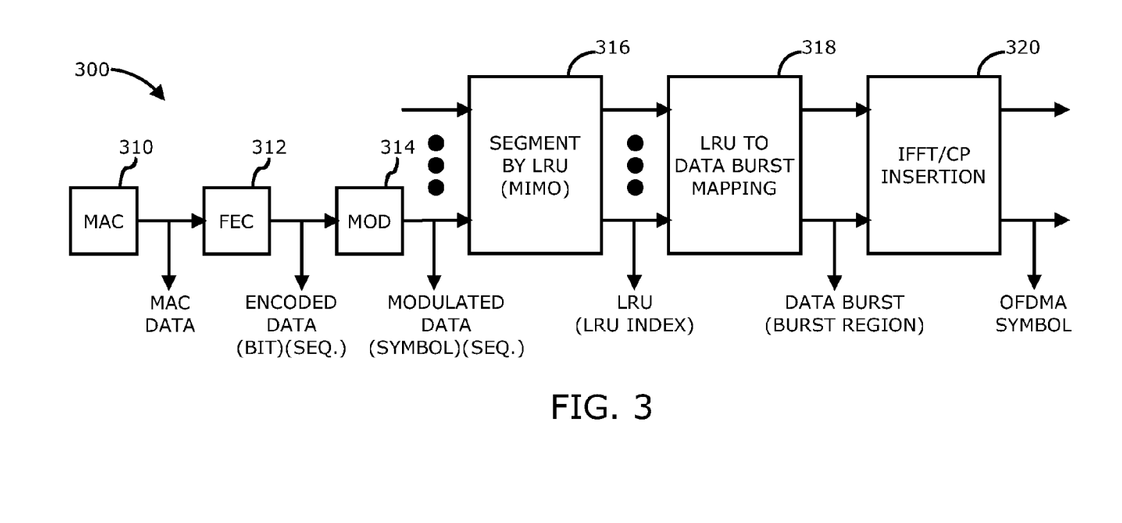
FIG. 3 is a diagram of an example processing chain capable of grouping small burst transmissions in accordance with one or more embodiments.

Referring now to FIG. 3, a diagram of an example processing chain capable of grouping small burst transmissions in accordance with one or more embodiments will be discussed. Processing chain 300 of FIG. 3 may comprise hardware and/or software in base station 110 capable of mapping a media access control (MAC) layer burst to an orthogonal frequency-division multiple access (OFDMA) symbol for transmission of multiple smaller bursts from multiple M2M devices aggregated into a larger payload. The processing chain 300 shown in FIG. 3 may be compliant with an IEEE 802.16m standard for purposes of example, and the scope of the claimed subject matter is not limited in this respect. Processing chain 300 may comprise a MAC block 310 to provide MAC data to a forward error correction (FEC) encoder block 312 to provide encoded data (bit and sequence). The FEC encoded data is provided to a modulation block 314 to provide modulated data (symbol and sequence) to a logical resource unit (LRU) block 316 for multiple-input, multiple-output (MIMO) operation to segment the data by LRU via an LRU index. Data burst mapping block 318 maps the LRU data to the payload data to be transmitted, and OFDMA symbols are generated for the data bursts via inverse fast Fourier transform (IFFT) processing and cyclical prefix (CP) insertion via IFFT/CP insertion block 320 for transmission of the OFDMA symbol. It should be noted that processing chain 300 is merely one example of processing blocks that may be utilized to aggregate smaller-sized data bursts into a single, larger payload, and more or fewer processing blocks may be utilized, in various other orders, and the scope of the claimed subject matter is not limited in these respects. An example forward error correction (FEC) encoding process per M2M device is shown in and described with respect to FIG. 4, below.

Figure 4:
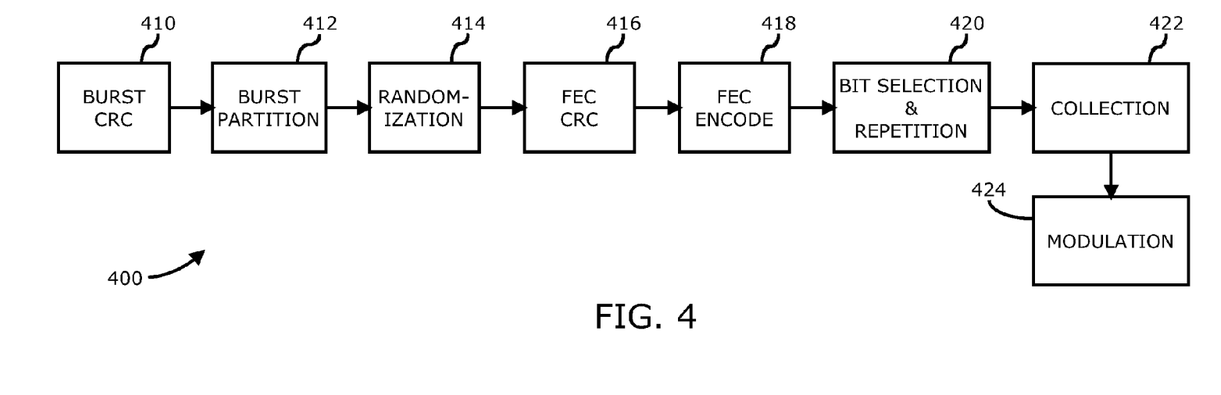
FIG. 4 is a diagram of an example forward error correction (FEC) encoding process per device in accordance with one or more embodiments.

Referring now to FIG. 4, a diagram of an example forward error correction (FEC) encoding process per device in accordance with one or more embodiments will be discussed. As shown in FIG. 4, FEC encoding process 400 illustrates a general method wherein device data from M2M devices is grouped together regardless of burst sizes from the individual devices. In practice, smaller bursts from the M2M devices may be grouped to fill in the payload of a minimum FEC block size, and the step of burst partitioning may or may not be utilized. In the example shown in FIG. 4, a cyclical redundancy check (CRC) may be performed on a data burst at block 410. The burst may be partitioned at burst partition block 412, and then may be randomized via randomization block 414. The output of randomization block 414 may be provided to forward error correction cyclical redundancy check (FEC CRC) block 416, and then encoded by FEC encoder block 418. Bit selection and repetition may be performed at bit selection & repetition block 420 and the data bits may be collected via collection block 422. The data may then be modulated at modulation block 424. Although FIG. 4 shows one particular order of the blocks of FEC encoding process 400, it should be noted that more or fewer blocks may be utilize and/or in various other orders, and the scope of the claimed subject matter is not limited in this respect. One particular example of how method 400 may be utilized to group burst data across devices is shown in and described with respect to FIG. 5, below.

Figure 5:
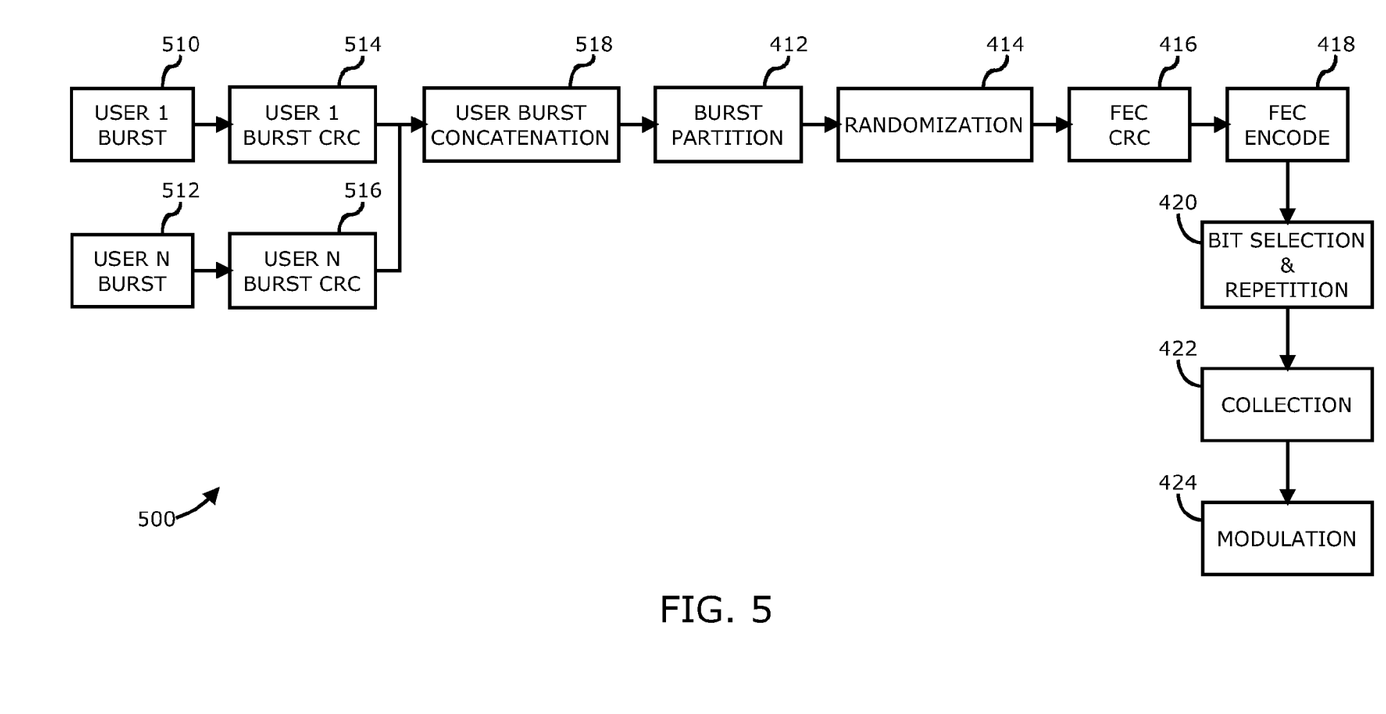
FIG. 5 is a diagram of one example method of grouping burst data across devices for joint forward error correction (FEC) encoding in the downlink in accordance with one or more embodiments.

Referring now to FIG. 5, a diagram of one example method of grouping burst data across devices for joint forward error correction (FEC) encoding in the downlink in accordance with one or more embodiments will be discussed. Method 500 of FIG. 5 is substantially similar to the method 400 of FIG. 4 wherein burst data from multiple M2M devices is grouped across the multiple devices for FEC encoding in the downlink transmission from base station 110 to the multiple M2M devices such as M2M mobile station 114, M2M mobile station 116, and/or M2M mobile station 118. Thus, as shown in FIG. 5, a first device burst 510 is provided to a first device burst CRC block 514 and combined with bursts from up to N other devices, such as Nth device burst 512 processed by Nth device burst CRC block 516. The bursts from the N devices are combined at device burst concatenation block 518 and provided to burst partition block 412 for further processing via FEC encoding method 500. In some embodiments, given the smaller sizes of the bursts per M2M device, burst partitioning via burst partition block 412 optionally may not be needed. It should be noted that as device data may be randomized via randomization block 414 prior to FEC coding via FEC encoder block 418, the bias resulting from unequal protection of the FEC operation may be fairly distributed across the N devices. It should be further noted that additional overhead reduction may be possible by employing a cyclical redundancy check across the aggregated data block rather than protecting each device data with a CRC check. Such an embodiment is shown in and described with respect to FIG. 6, below.

Figure 6:
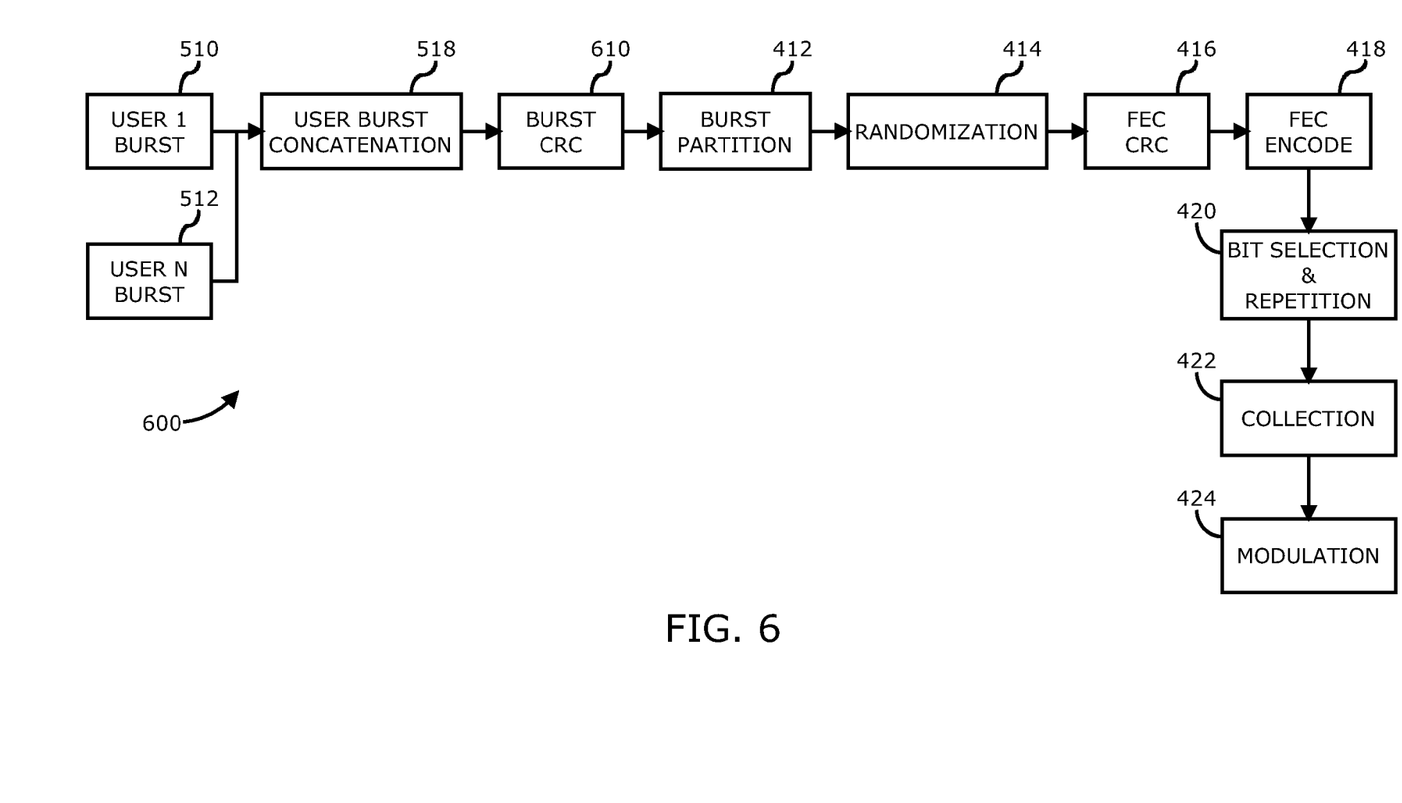
FIG. 6 is a diagram of another example method of grouping burst data across devices for joint forward error correction (FEC) encoding in the downlink in accordance with one or more embodiments.

Referring now to FIG. 6, a diagram of another example method of grouping burst data across devices for joint forward error correction (FEC) encoding in the downlink in accordance with one or more embodiments will be discussed. Method 600 of FIG. 6 is substantially similar to the method 500 of FIG. 5 wherein a single CRC process via burst CRC block 610 may be applied across all N devices to lower overhead. Using a single aggregate CRC across all M2M devices via burst CRC block 610 may be utilized when the overhead of potentially using a larger CRC check across a larger block size to achieve the same level of error detection capability is lower than when individual CRCs are used to protect each small burst. As a result, retransmissions across all N devices resulting in the event of a failure of a group CRC does not cause additional overhead when compared to the savings in overhead that is achieved via eliminating per-device CRC as shown in FIG. 6. Methods to identify the location of the device bursts in an aggregated data block are shown in and described with respect to FIGS. 7A, 7B, and 7C, below.

Figure 7A:
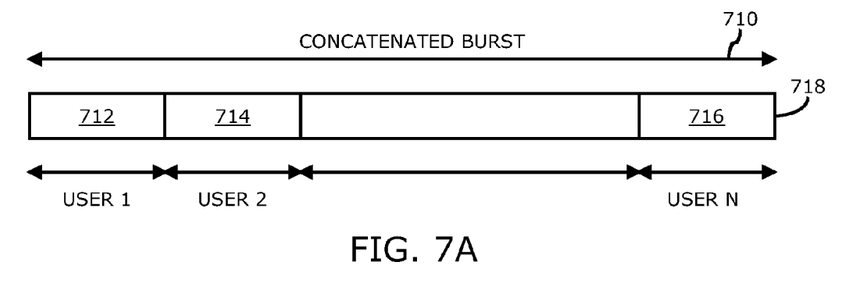
FIG. 7A-7C are diagrams of several example methods to identify the location of the device bursts within an aggregated data block in accordance with one or more embodiments.
Figure 7B:
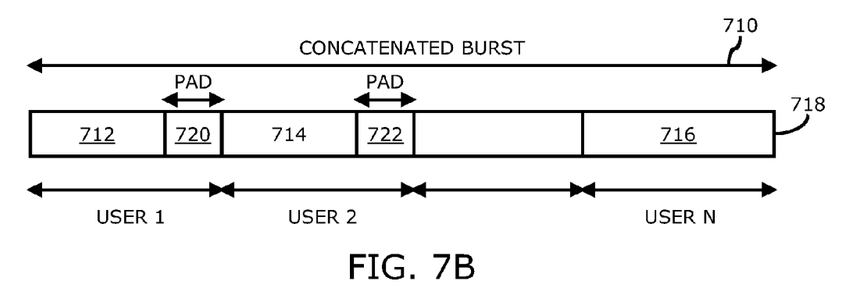
Figure 7C:
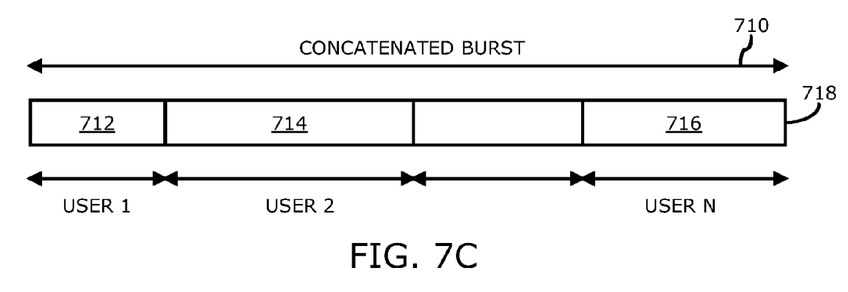

Referring now to FIGS. 7A-7C, diagrams of several example methods to identify the location of the device bursts within an aggregated data block in accordance with one or more embodiments will be discussed. As shown in FIG. 7A, bursts from multiple M2M devices may be concatenated via device burst concatenation block 518 into a concatenated burst 710. In FIG. 7A, the concatenated burst 710 may comprise multiple fixed-size sub-bursts per each of the N devices, for example, sub-burst 712 for a first device (DEVICE 1), sub-burst 714 for a second device (DEVICE 2), up to sub-burst 716 for the Nth device (DEVICE N). In the embodiment shown in FIG. 7A, no padding is added to each sub-burst. The size of each sub-burst and the resulting zero padding are indicated within the downlink message header. Typically, the size of each device data is encoded by the radio link/MAC layer as part of the message data itself. For this embodiment, it is assumed that each device is may be assigned a fixed location within the aggregated data block 718, and an unused payload of the fixed allocation may be padded with zeros, for example, after the Nth device's sub-burst 716. The number of devices being aggregated and their relative order within the group of sub-bursts may be inferred from the group control signaling described in further detail, below, and in one or more embodiments may be determined via IEEE 802.16m group signaling mechanisms, although the scope of the claimed subject matter is not limited in this respect. For decoding of the concatenated burst 710 by the devices, once the aggregate FEC block is decoded each device may infer the location of its corresponding sub-burst by their respective assigned order within the group and the fixed payload size by dividing the aggregate block size by the N number of devices assigned to the concatenated sub-burst 710.

If the burst size is not indicated as part of the message header, then additional control signaling may be implemented in the group signaling to indicate either the length of the burst or the length of the pad, or combinations thereof. In one or more embodiments, an optimal signaling mechanism may be dependent on the burst sizes of each device. For example, if all of the devices have similar burst sizes, then the length of the pad may be small and a fewer number of control bits may be expended to indicate the number of padded bits added to the respective sub-bursts as shown in FIG. 7B. Thus, a number of padded bits may be added as a pad to a given sub-burst, such as pad 720 added to sub-burst 712 or pad 722 added to sub-burst 714, in order to result in a fixed size for all or nearly all of the sub-bursts. The padded bits may be utilized without utilizing MAC message headers, for example, the length of the message within the fixed sub-bursts or the size of the pads may be indicated via control signaling.

If the device grouping is such that the payload sized for the respective devices differs substantially among the devices, then variable-sized sub-bursts across the devices may be implemented as shown in FIG. 7C, rather than fixed-size sub-bursts. In such embodiments, the physical layer (PHY) control signaling may directly indicate the size of the burst instead of relying on a MAC layer message header. Alternatively, the start of a next burst may be utilized to delineate device data between two devices. It should, however, be noted that the examples of utilizing fixed size sub-bursts as shown in FIG. 7A, padded fixed-size sub-bursts as shown in FIG. 7B, and variable-size sub-bursts as shown in FIG. 7C are merely examples of how sub-bursts across multiple devices or devices may be aggregated into a concatenated burst 710, and various other methods may likewise be implemented, and the scope of the claimed subject matter is not limited in this respect.

In one or more embodiments, the format of the sub-bursts may be selected dynamically. In such embodiments, an optimal selection of the format for the sub-bursts, such as sub-burst 712, sub-burst 714, and/or sub-burst 716, and how devices within the bursts are identified may be dependent on the distribution of data sizes across devices within the group. While group selection mechanisms may be identified that favor certain types of distribution, in one or more embodiments dynamic sub-burst indication formats may be utilized to allow the operator to find an efficient or the most efficient format for specific burst-size distributions. In such embodiments, the format in effect may be indicated by adding a few control signaling bits to the group signaling mechanism, for example, as discussed below, although the scope of the claimed subject matter is not limited in this respect.

In one or more embodiments, modifications may be provided to the control channel to indicate group data transmission. The mechanisms for forming and indicating group transmissions already may be in place in standards such as the IEEE 802.16m standard. Such mechanisms may be in place only for grouping control information across devices. These specifications call for contiguous orthogonal frequency-division multiple access (OFDMA) symbol allocations for devices within the group so that it is sufficient to indicate the start and end of only the first OFDMA burst in the group, and the OFDMA burst locations of all remaining devices may be derived from the fact that the burst, or sub-bursts, appear contiguously at fixed offsets based on their order within the group. As a result, in one or more embodiments, control channel signaling may be modified to indicate that devices in the group may share the same FEC code in the downlink. Such modification of control channel signaling may be accomplished by adding an additional bit to the exiting device group bit-map. Similarly, additional control signaling may be added to indicate the device burst identification mechanism currently in use with the associated burst size information if required.

In one or more embodiments, several device grouping mechanisms may be utilized to group transmissions across multiple devices. In some embodiments, such mechanisms may already be in use for grouping control information. For example, devices with similar data-rate requirements and persistent allocations may be grouped together to minimize frequent changes to the device groups. Devices having similar channel conditions may also be grouped together, which may support similar modulation coding scheme (MCS) sizes. Other grouping methods likewise may be utilized, for example, signal to interference-plus-noise ratio (SINR) based grouping, machine-to-machine (M2M) service identification (ID) based grouping, or device location-based groupings, and so on, and the scope of the claimed subject matter is not limited in this respect.

Figure 8:
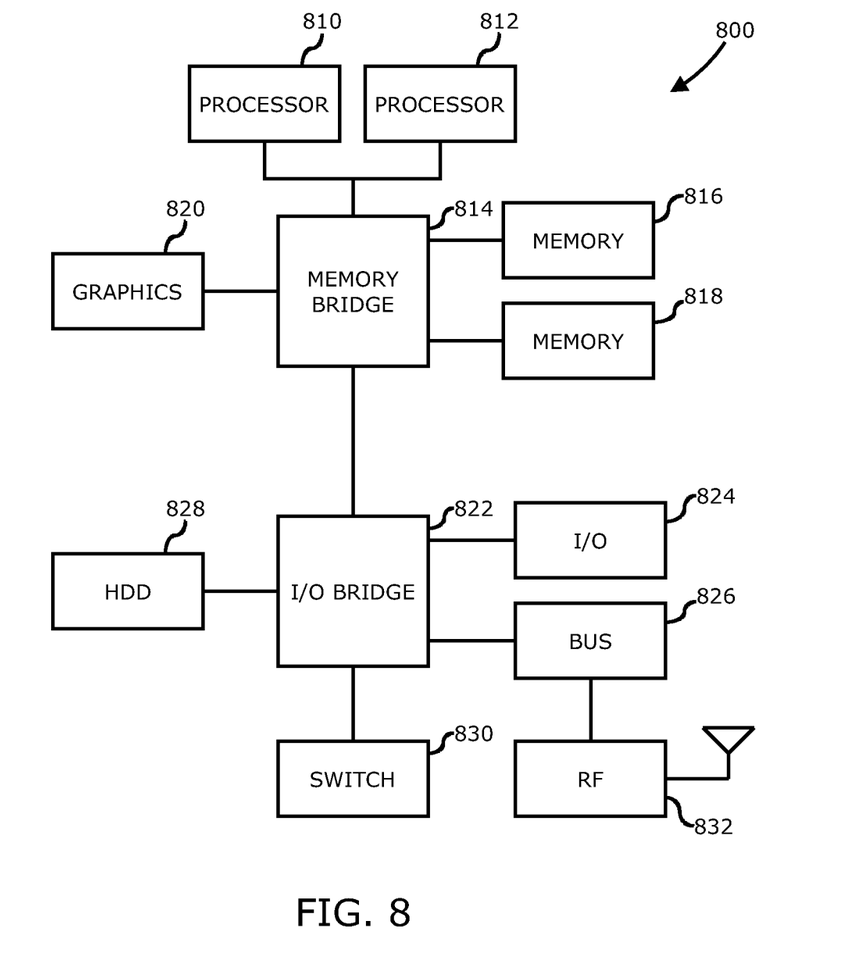
FIG. 8 is a block diagram of an information-handling system capable of grouping small burst transmissions for downlink machine-to-machine communications in accordance with one or more embodiments.

Referring now to FIG. 8, a block diagram of an information-handling system is shown that is capable of grouping small-burst transmissions for downlink machine-to-machine communications in accordance with one or more embodiments. Information-handling system 800 of FIG. 8 may tangibly embody one or more of any of the network elements of network 100 as shown in and described with respect to FIG. 1. For example, information-handling system 500 may represent the hardware of base station 110 and/or M2M mobile station 114, with greater or fewer components depending on the hardware specifications of the particular device or network element. Although information-handling system 800 represents one example of several types of computing platforms, information-handling system 800 may include more or fewer elements and/or different arrangements of elements than shown in FIG. 8, and the scope of the claimed subject matter is not limited in these respects.

Information-handling system 800 may comprise one or more processors such as processor 810 and/or processor 812, which may comprise one or more processing cores. One or more of processor 810 and/or processor 812 may couple to one or more memories 816 and/or 818 via memory bridge 814, which may be disposed external to processors 810 and/or 812, or alternatively at least partially disposed within one or more of processors 810 and/or 812. Memory 816 and/or memory 818 may comprise various types of semiconductor-based memory, for example, volatile-type memory and/or non-volatile-type memory. Memory bridge 814 may couple to a graphics system 820 to drive a display device (not shown) coupled to information-handling system 800.

Information-handling system 800 may further comprise input/output (I/O) bridge 822 to couple to various types of I/O systems. I/O system 824 may comprise, for example, a universal serial bus (USB) type system, an IEEE 1394 type system, or the like, to couple one or more peripheral devices to information-handling system 800. Bus system 826 may comprise one or more bus systems, such as a peripheral component interconnect (PCI) express type bus or the like, to connect one or more peripheral devices to information-handling system 500. A hard disk drive (HDD) controller system 828 may couple one or more hard disk drives or the like to information-handling system, for example, Serial ATA type drives or the like, or alternatively a semiconductor-based drive comprising flash memory, phase-change and/or chalcogenide-type memory or the like. Switch 830 may be utilized to couple one or more switched devices to I/O bridge 822, for example, Gigabit Ethernet type devices or the like. Furthermore, as shown in FIG. 8, information-handling system 800 may include a radio-frequency (RF) block 832 comprising RF circuits and devices for wireless communication with other wireless communication devices and/or via wireless networks such as network 100 of FIG. 1, for example, in which information-handling system 800 embodies base station 110 and/or M2M mobile station 114, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to grouping small burst transmissions for downlink machine-to-machine communications and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method to aggregate machine-to-machine (M2M) transmissions in the downlink in a wireless network, the method comprising:
    aggregating two or more M2M media access control layer (MAC-layer) bursts to be transmitted to one or more respective M2M devices;
    concatenating the two or more M2M MAC-layer bursts into a concatenated burst wherein the concatenated burst comprises two or more sub-bursts corresponding to the two or more M2M bursts, and wherein the sub-bursts are fixed in size for the one or more M2M devices and further comprise a pad for two or more of the sub-bursts to result in the fixed size, and a size of the sub-burst or the pad, or combinations thereof, is indicated via group control signaling channels, wherein said concatenating is executed until at least a minimum payload size is achieved;
    performing a single cyclic redundancy check (CRC) on the two or more concatenated M2M MAC-layer bursts of the concatenated burst, the concatenated burst further comprising the single CRC;
    encoding the concatenated burst as a single payload to be transmitted; and
    transmitting the payload to the one or more M2M devices such that the M2M devices are capable of decoding their respective sub-bursts in the concatenated burst.

2. A method as claimed in claim 1, wherein said encoding comprises forward error correction encoding wherein the forward error correction encoding is shared across all of the one or more M2M devices.

3. A method as claimed in claim 1, wherein the sub-bursts are fixed in size for the one or more M2M devices, and further comprising, if there is any unused portion of the payload, adding a pad comprising zeros to the unused portion of the payload, wherein a size of the sub-burst or the pad, or combinations thereof, is indicated via media access control (MAC) layer signaling embedded in the burst payload.

4. A method as claimed in claim 1, wherein the sub-bursts are variable in size for the one or more M2M devices.

5. A method as claimed in claim 1, wherein the sub-bursts are grouped in the concatenated burst by grouping together sub-bursts from M2M devices having similar data rate requirements, similar persistent allocation requirements, similar signal to interference-plus-noise ratio (SINR) values, by M2M service identification, by device location, or combinations thereof.

6. A method as claimed in claim 1, further comprising indicating a mechanism for determining how the sub-bursts are ordered or grouped, or combinations thereof, in the concatenated burst, wherein sub-bursts for an M2M device are identified dynamically based at least in part on a number of M2M devices in a group of M2M devices and a distribution of their respective burst sizes.

7. A method to decode aggregated machine-to-machine (M2M) transmissions received in the downlink, the method comprising:
    receiving a concatenated burst comprising a plurality of concatenated sub-bursts for one or more M2M devices, each concatenated sub-burst comprising a M2M media access control layer (MAC-layer) burst, and the concatenated burst further comprising a single cyclic redundancy check (CRC) for the plurality of M2M MAC layer bursts, wherein said concatenated sub-bursts comprise at least a minimum payload size;
    decoding the concatenated burst;
    identifying the sub-burst intended for the present M2M device, wherein said identifying comprises determining an ordering of the sub-bursts within the concatenated burst, and inferring which burst is the intended burst based at least in part on the ordering of the sub-bursts and a size of the sub-bursts, and wherein the size of the sub-bursts is fixed, and said inferring comprises dividing the concatenated burst by the fixed burst size, wherein said inferring may be based at least in part on group control signaling; and
    extracting data from the identified sub-burst.

8. A method as claimed in claim 7, wherein said inferring may be based at least in part on media access control (MAC) layer signaling embedded within the burst payload.

9. A method as claimed in claim 7, wherein the size of the sub-bursts is fixed with a pad added to one or more of the sub-bursts, and said inferring comprises determining a pad size for the sub-bursts to determine a location of the intended sub-burst via group control signaling channels.

10. A method as claimed in claim 7, wherein the size of the sub-bursts is variable among the one or more M2M devices, and the size of a sub-burst is indicated via group control signaling channels.

11. A base station or an aggregation point to aggregate machine-to-machine (M2M) transmissions in a downlink in a wireless network, the base station comprising:
    a processor and a memory coupled to the processor; and
    a radio-frequency transceiver coupled to the processor, wherein the memory has instructions stored thereon to configure the processor to:
        group together two or more M2M media access control layer (MAC-layer) bursts to be transmitted to one or more respective M2M devices, wherein the MAC-layer bursts that have similar characteristics are grouped together;
        concatenate the two or more grouped M2M MAC-layer bursts into a concatenated burst, wherein the concatenated burst comprises one or more sub-bursts corresponding to the two or more M2M MAC-layer bursts, wherein the sub-bursts are fixed in size for the one or more M2M devices, one or more of the sub-bursts include a pad to result in a fixed size, and a size of the sub-burst or the size of the pad, or combinations thereof, is indicated via group control signaling, wherein the M2M bursts are concatenated as a group of sub-bursts that together comprise at least a minimum payload size;
        perform a single cyclic redundancy check (CRC) on the two or more grouped M2M MAC-layer bursts of the concatenated burst, the concatenated burst further comprising the single CRC;

encode the concatenated burst as a single payload of an orthogonal-frequency division multiple access (OFDMA) symbol; and transmit the OFDMA symbol to the one or more M2M devices via the radio-frequency transceiver such that the M2M devices are capable of decoding the OFDMA symbol to obtain their respective sub-bursts in the concatenated burst.

12. A base station or an aggregation point as claimed in claim 11, wherein the concatenated burst is forward error correction encoded across all of the two or more M2M devices.

13. A base station or an aggregation point as claimed in claim 11, wherein the sub-bursts are fixed in size for the one or more M2M devices, and if there is any unused portion of the payload, the unused portion of the payload is padded with a pad of zeros, wherein a size of the sub-burst or the pad, or combinations thereof, is indicated via media access control (MAC) layer signaling embedded in the burst payload.

14. A base station or an aggregation point as claimed in claim 11, wherein the sub-bursts are variable in size for the one or more M2M devices.

15. A base station or an aggregation point as claimed in claim 11, wherein the similar characteristics of the grouped together bursts comprise data rate requirements, persistent allocation requirements, signal to interference-plus-noise ratio (SINR) values, by M2M service identification, by device location, or combinations thereof.

16. A base station or an aggregation point as claimed in claim 11, wherein the OFDMA symbol indicates a mechanism for determining how the sub-bursts are ordered or grouped, or combinations thereof, in the concatenated burst, wherein sub-bursts for an M2M device are identified dynamically based at least in part on the number of M2M devices in a group of M2M devices and a distribution of their respective burst sizes.

17. A receiver to decode aggregated machine-to-machine (M2M) transmissions received in the downlink, the receiver comprising:

a processor and a memory coupled to the processor; and a radio-frequency transceiver coupled to the processor, wherein the memory has instructions stored thereon to configure the processor to:

receive an orthogonal frequency-division multiple access (OFDMA) symbol via the radio-frequency transceiver, the OFDMA symbol having a payload comprising two or more sub-bursts for one or more devices, each sub-burst comprising a M2M media access control layer (MAC-layer) burst concatenated in the payload, and the payload further comprising a single cyclic redundancy check (CRC) for the two or more concatenated M2M MAC layer bursts, wherein the size of the sub-bursts is variable among the one or more devices, and the size of a sub-burst is indicated via group control signaling, wherein said sub-bursts comprise a payload of at least a minimum payload size;

decode the OFDMA symbol to obtain the payload;

determine which sub-burst in the payload is intended for the present device; and extract data from the intended sub-burst.

18. A receiver as claimed in claim 17, wherein the instructions further configure the processor to:

determine an ordering of the sub-bursts within the concatenated burst; and infer which burst is the intended burst based at least in part on the ordering of the sub-bursts and a size of the sub-bursts.

19. A receiver as claimed in claim 18, wherein the size of the sub-bursts is fixed, and the intended burst is inferred by dividing the concatenated burst by the fixed burst size.

20. A receiver as claimed in claim 18, wherein the size of the sub-bursts is fixed with a pad added to one or more of the sub-bursts, and the intended burst is inferred by determining a pad size for the sub-bursts to determine a location of the intended sub-burst.

21. A method, comprising:

assigning a fixed burst size to data bursts from two or more users;

applying a CRC check to the two more data bursts from the two or more users;

concatenating the two or more data bursts into an aggregated data block, wherein a number of users of the aggregated data block and an order of the bursts in the aggregated data block are indicated via group control signaling, wherein if the aggregated data block is smaller than a minimum payload size, padding the aggregated data block so that the aggregated data block is at least the minimum payload size;

encoding the aggregated data block; and transmitting the encoded data block to the two or more users.

22. A method as claimed in claim 21, further comprising, if the aggregated data block is smaller than a minimum payload size, padding the aggregated data block so that the aggregated data block is at least the minimum payload size.

23. A method as claimed in claim 21, further comprising randomizing the aggregated data block prior to said encoding.

24. A method, comprising:

receiving an aggregated data block;

decoding the aggregated data block to result in two or more data bursts from two or more users;

determining a number of users of the aggregated data block and an order of bursts in the aggregated data block from group control signaling to identify which of the two or more data bursts is intended for a present user, wherein the aggregated data block of two or more data bursts comprise at least a minimum payload size; and obtaining data from the identified burst.

25. A method as claimed in claim 24, wherein said determining comprises dividing the aggregated data block by the number of users to determine a fixed block size per user.

* * * * *